E. M. STILES.
HOLDER FOR SLICING MACHINES.
APPLICATION FILED MAR. 4, 1918.
1,294,562.
Patented Feb. 18, 1919.
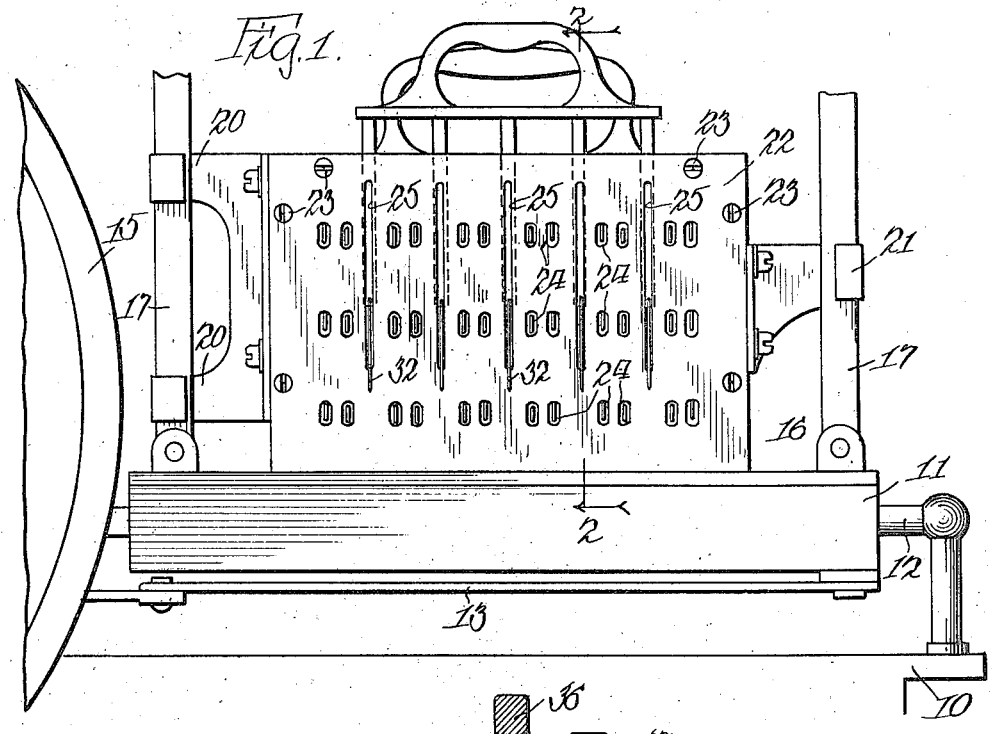
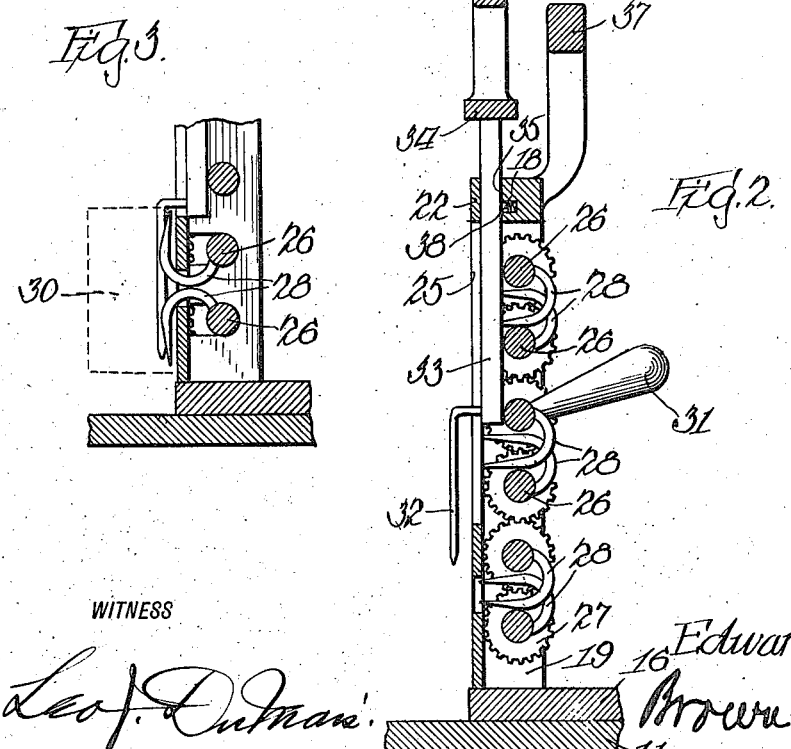
WITNESS
INVENTOR
Edward M. Stiles.
ATTORNEYS

UNITED STATES PATENT OFFICE.

EDWARD M. STILES, OF MOUNT PLEASANT, IOWA, ASSIGNOR TO U. S. SLICING MACHINE COMPANY, OF LAPORTE, INDIANA, A CORPORATION OF INDIANA.

HOLDER FOR SLICING-MACHINES.

1,294,562.　　　　Specification of Letters Patent.　　Patented Feb. 18, 1919.

Application filed March 4, 1918. Serial No. 220,126.

*To all whom it may concern:*

Be it known that I, EDWARD M. STILES, a citizen of the United States, and residing at Mount Pleasant, in the county of Henry and State of Iowa, have invented certain new and useful Improvements in Holders for Slicing-Machines, of which the following is a specification.

This invention relates to mechanism for holding material while it is being sliced, and is intended for use in connection with slicing machines of usual construction. The invention has for its object the provision of a device of the class named which shall be of improved construction and operation, and is exemplified in the combination and arrangement of parts shown in the accompanying drawing and described in the following specification, and it is more particularly pointed out in the appended claims.

In the drawings—Figure 1 is an elevation of a portion of a slicing machine having a device embodying one form of the present invention applied thereto; Fig. 2 is a vertical sectional view on line 2—2 of Fig. 1, with the guard removed to show the intermeshing spur gears; and Fig. 3 is a fragmentary vertical sectional view of the lower portion of the holder showing the teeth for gripping the meat in their holding position.

In Fig. 1 of the drawing, the numeral 10 designates the base or frame of a slicing machine on which a table 11 is mounted for reciprocating movement and is supported by ways 12. The table 11 is moved back and forth upon its guides by a pitman 13 and a crank 14 operated in a manner well known in the art. A slicing knife is shown at 15 in the drawing. A meat plate 16 is carried upon the upper surface of the table 11 and may be provided with the usual feed mechanism for moving it forwardly upon the table to advance the work to the slicing knife. Uprights 17 are carried adjacent the forward edge of the meat plate 16 to which the clamp for holding the meat upon the plate 16 is secured. The present invention is designed to be used in place of the usual form of meat clamp and is especially adapted for holding a piece of meat or other material while the last portion thereof is being cut into slices. A frame comprising a horizontal top bar 18 and vertical side bars 19, is secured to the uprights 17 by hooks 20 and 21. A plate 22 is fastened to the front side of the frame members 18 and 19 by screws 23 and forms an abutment against which the material to be sliced is held by mechanism to be described. The plate 23 is provided with a series of short vertical slots 24 and also a plurality of longer vertical slots 25 which are interspersed between the slots 24. Journaled in the uprights 19 of the main frame of the work-holder, and in the rear of the plate 22, is a series of horizontal vertically spaced shafts 26, each of which carries a spur gear 27 at one end adjacent one of the uprights 19. The spur gears 27 all intermesh with one another, so that when one of the shafts 26 is oscillated in its bearings all of the other shafts will be simultaneously moved, each shaft moving in an opposite direction to the one next adjacent thereto. Each shaft 26 carries a series of curved teeth or needles 28, there being one tooth for each of the slots 24 in the plate 22. The relation of the tooth to its supporting shaft 26 and slot 24 is such that when the shaft is rotated the tooth will be projected forwardly through the slot into the position shown in Fig. 3, to engage the material to be sliced, indicated by broken lines at 30 in that figure.

It will be apparent from Figs. 2 and 3 that the teeth 28 will first enter the material 30 in a direction practically normal to the face of the material held against the plate 22. Further rotation of the shaft 26 will cause adjacent rows of teeth to move through the material in opposite directions, so that the force exerted by one row will be opposed by that exerted by the other, and there will thus be no tendency to shift the material relative to the plate. The final movement of the points of the teeth is in a direction backwardly toward the plate, so that the meat is drawn tightly against the front face of the plate. The rotation of the shafts 26 may be effected by a handle 31 extending rearwardly from any one of the shafts 26.

The mechanism thus far described is very effective for holding a piece of meat which has been cut to provide an even surface of sufficient extent to permit engagement of the meat by a considerable number of the teeth 28. Where it is desired, however, to hold the meat by a portion which presents only a comparatively limited surface, or in which the surface is uneven, and can be penetrated by only a comparatively small number of the teeth 28, it has been found that the result can be secured more efficiently by using supplementary impalement pins in coöperation with the teeth 28. These impalement pins are especially useful in holding the uncut end of a piece of meat, such as the shank end of a piece of boiled ham or the exposed edge of a piece of bacon. It is desirable to hold meat during the final slicing operation by these untrimmed portions, if possible, since these portions constitute waste matter, and there is consequently no loss if they are not sliced. Supplementary impalement pins are also advantageous in holding meats or other material of a loose texture, because of the extended engagement which these pins have with the material. A series of such pins is shown at 32 in the drawing, the pins being carried by the vertical bars 33 having their upper ends connected by a horizontal bar 34 arranged above the frame member 18. The bars 33 lie adjacent the rear face of the plate 22 just behind the vertical slots 25, and the impalement pins 32 extend through these slots into a position in front of the plate 22 and are spaced from the plate a distance approximately equal to the distance which the teeth 28 project through the plate when they are in work-holding position. The bars 33 extend through guide openings 35 in the frame member 18 and are free to slide up and down between the plate 22 and the rock shafts 26. A handle 36 is carried by the bar 34 for operating the impalement pins 32. A second handle 37 may be secured to the frame member 18 for manipulating the entire work-holding device. A spring pressed friction block 38 may be embedded in the frame member 18 to hold the vertical bars 33 in any position of adjustment to which they may be moved by the handle 36.

In operation the material to be sliced is placed against the front face of the plate 22 while the teeth 28 are in the position shown in Fig. 2 and while the impalement pins are raised to their uppermost position. The handle 31 is then pressed downwardly to force as many of the teeth 28 as are in position to engage the material, through the openings 24 and into position to hold the material against the plate. The impalement pins 32 are then moved downwardly by the handle 36 and are forced through portions of the material in a direction parallel with the face of the plate, after the material has been drawn backwardly into close engagement with the plate by the teeth 28. Thus the two sets of teeth are made to coöperate with one another to provide a firm grip upon the meat, even though the surface presented to the plate 22 may be small and uneven, or the material of such loose texture that the teeth 28 alone would be unable to get sufficient purchase upon the meat to resist the pressure of the slicing knife 15.

I claim:

1. A work-holder for slicing machines comprising a frame, teeth carried by said frame, mechanism for moving some of said teeth in one direction relative to said frame to cause said teeth to penetrate material to be sliced, and for moving other of said teeth in an opposite direction through said material, and elongated impalement pins for engaging said material to coöperate with said teeth to hold said material.

2. A work-holder for slicing machines, comprising a plate, a plurality of teeth for holding material against said plate while it is being sliced, means for moving said teeth forwardly relative to said plate into said material and laterally relative to said plate to cause said teeth to grip said material against the face of said plate, and elongated impalement pins movable parallel with the face of said plate through said material into position to coöperate with said teeth to hold said material against said plate.

3. A work-holder for slicing machines comprising a plate having openings therethrough, teeth for holding material against the face of said plate, means for projecting said teeth through said plate into engagement with said material, and elongated impalement pins movable in the direction of the plane of said plate into engagement with said material to coöperate with said teeth in holding said material against said plate.

4. A work-holder for slicing machines, comprising a plate, a plurality of teeth for holding material against the face of said plate while it is being sliced, means for moving said teeth forwardly relative to said plate into engagement with said material, and laterally relative to said plate for causing said teeth to bind said material against the face of said plate, the lateral movement of a portion of said teeth being in a direction opposed to the lateral movement of others of said teeth, so that the lateral forces exerted by said teeth upon said material will be counteracted by one another, elongated impalement pins for engaging said material, and means for moving said impalement pins in a direction substantially parallel to the plane of said plate into holding engagement with said material after said teeth have been moved into holding position.

5. A work-holder for slicing machines, comprising a frame, a plurality of parallel shafts carried by said frame, curved teeth projecting laterally from said shafts, means for rotating said shafts in unison with one another so that the teeth carried by some of said shafts will move in opposite directions to the teeth carried by other of said shafts; to cause said teeth to enter material to be sliced, and elongated impalement pins movable independently of said teeth into engagement with said material to coöperate with said teeth in holding said material.

6. A work-holder for slicing machines, comprising a frame, a plate carried by said frame having a plurality of openings therethrough, a series of parallel shafts mounted on said frame in the rear of said plate, curved teeth carried by said shafts in position to be projected through said openings when said shafts are rotated in one direction, means for rotating said shafts in unison with one another to project said teeth through said openings and laterally relative thereto, the relative rotation of said shafts being such that the lateral movement of a portion of such teeth shall be in a direction opposed to the lateral movement of the remainder of said teeth, a supplemental frame movable relative to said first mentioned frame, and elongated impalement pins carried by said supplemental frame and movable into position to penetrate material held by said teeth against said plate after said teeth have been caused to engage said material.

In testimony whereof I have signed my name to this specification on this 26 day of February, A. D. 1918.

EDWARD M. STILES.

Witnesses:
FRANK B. HAVILAND,
WILLIAM R. BUDDE.